(No Model.) 6 Sheets—Sheet 1.

W. TAYLOR.
HAND DRIVING GEAR FOR CYCLES.

No. 605,559. Patented June 14, 1898.

WITNESSES
Baldwin Vale.
Norman W. Keller

INVENTOR
Walter Taylor
BY
E. S. Murdock & Co.
ATTORNEYS

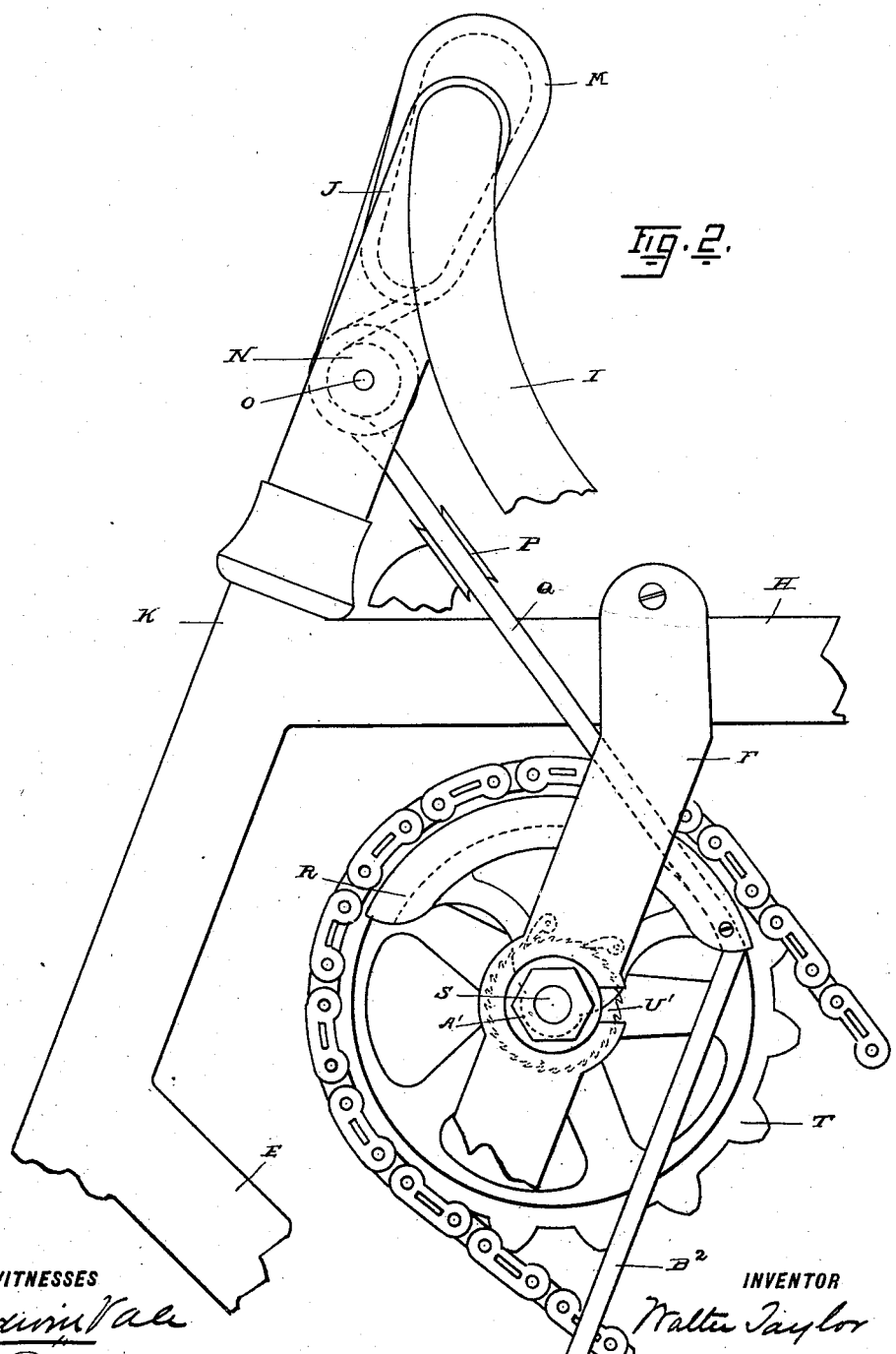

(No Model.)  6 Sheets—Sheet 3.
W. TAYLOR.
HAND DRIVING GEAR FOR CYCLES.
No. 605,559. Patented June 14, 1898.
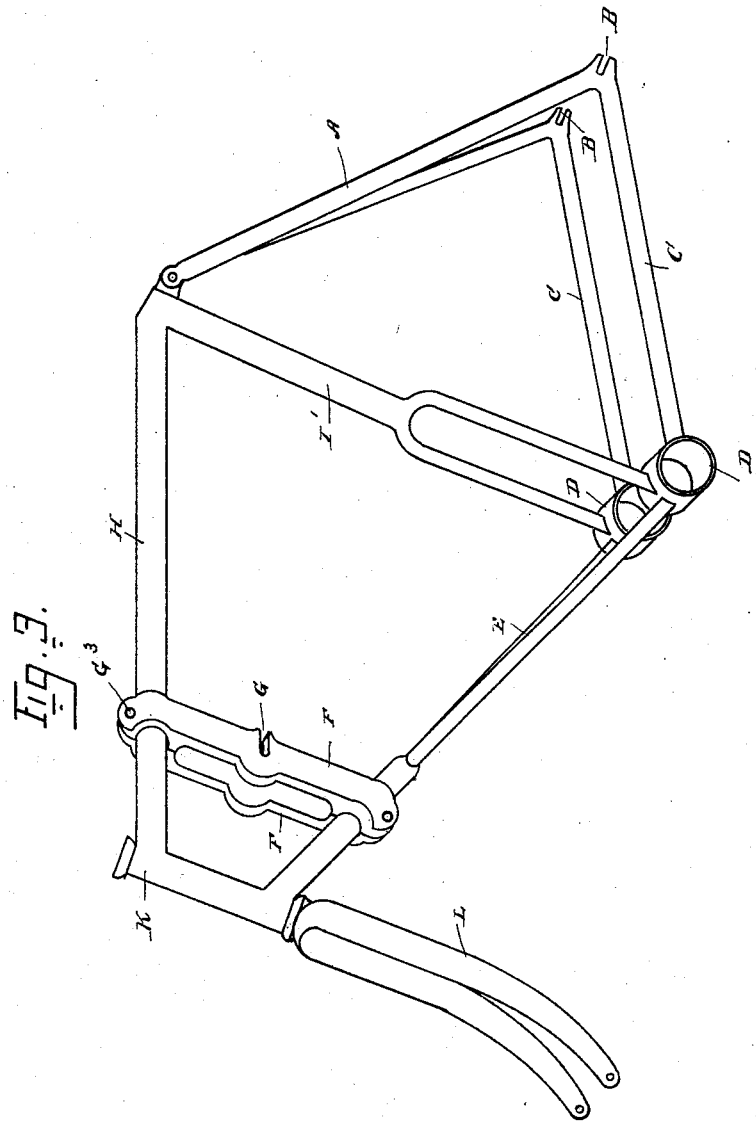
WITNESSES
INVENTOR
BY
ATTORNEYS.

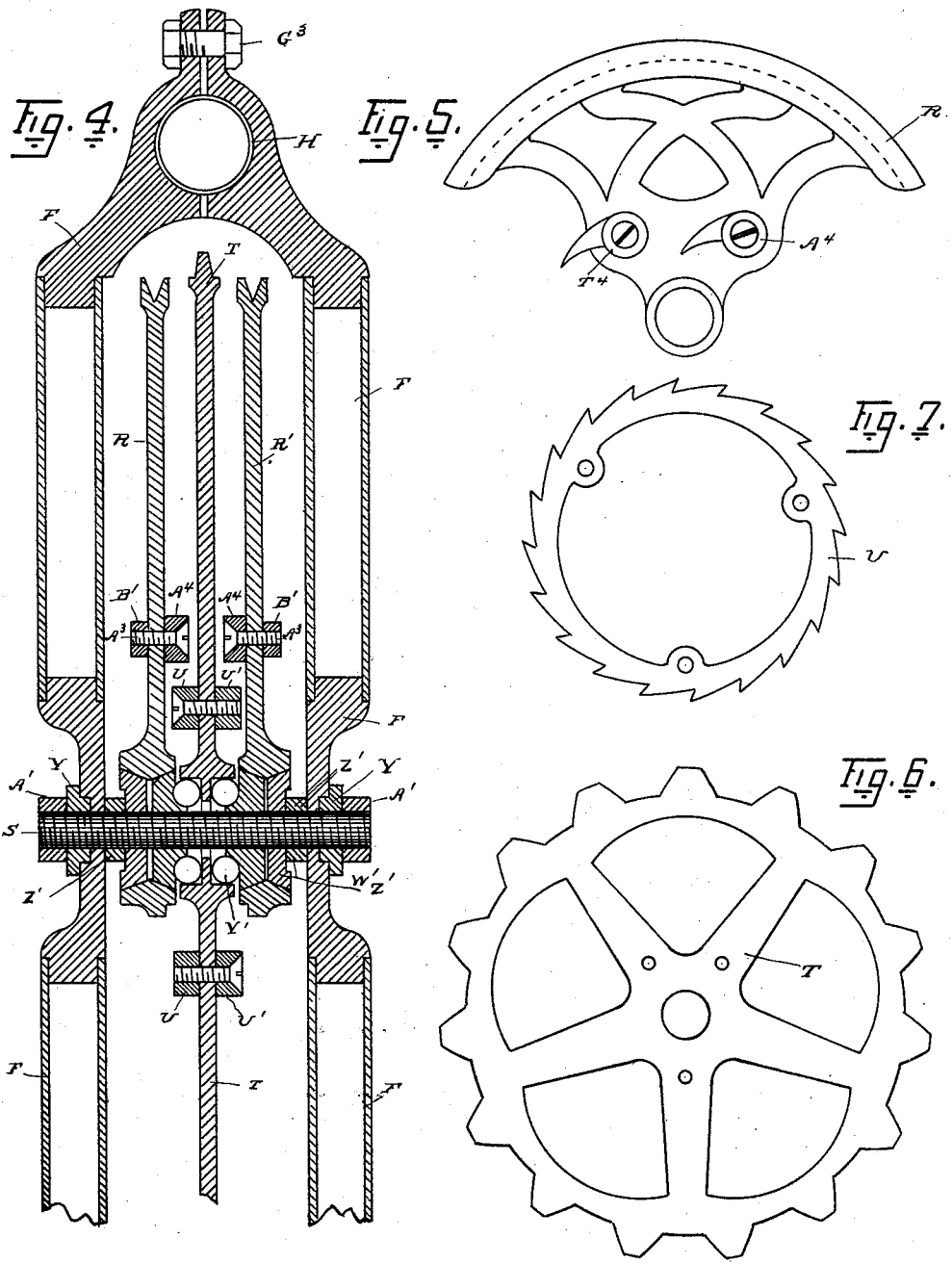

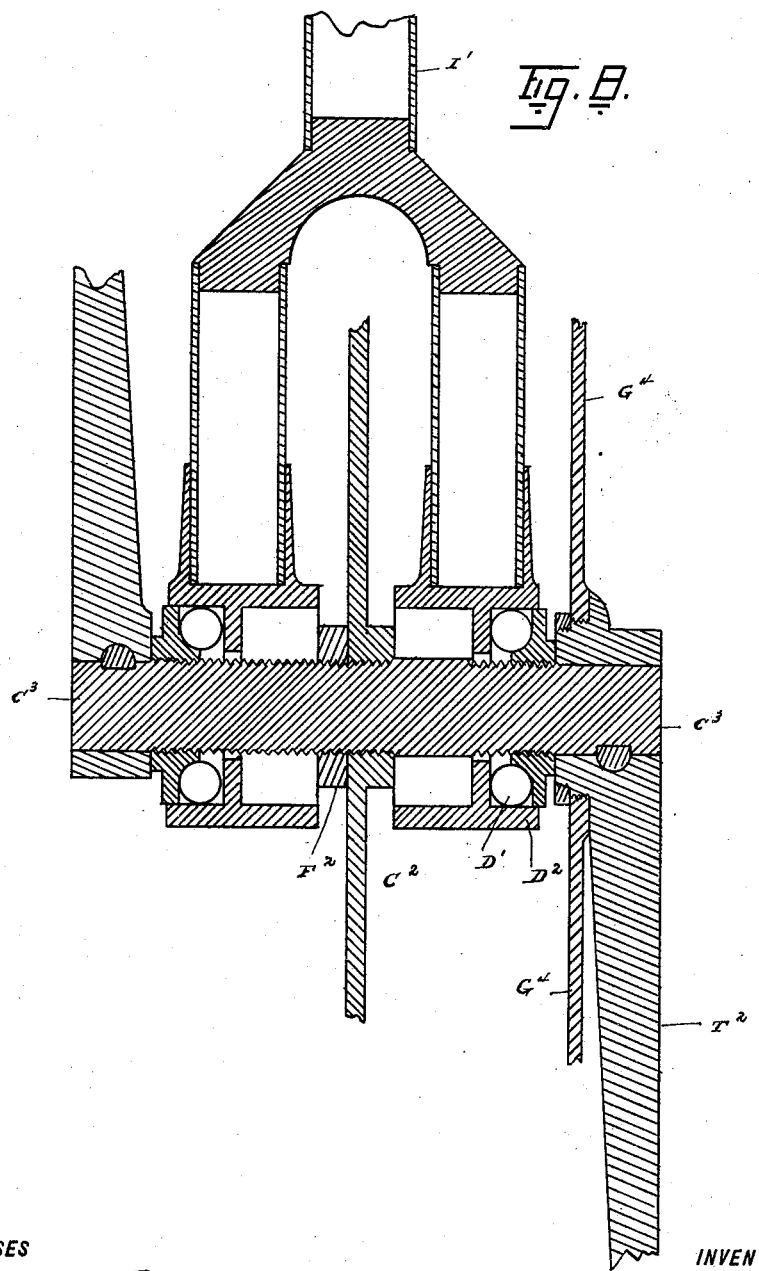

(No Model.) 6 Sheets—Sheet 6.

W. TAYLOR.
HAND DRIVING GEAR FOR CYCLES.

No. 605,559. Patented June 14, 1898.

WITNESSES
Baldwin Vale
Norman A. Aller

INVENTOR
Walter Taylor
BY
E. F. Murdock & Co.
ATTORNEYS.

UNITED STATES PATENT OFFICE.

WALTER TAYLOR, OF BRISBANE, QUEENSLAND.

HAND DRIVING-GEAR FOR CYCLES.

SPECIFICATION forming part of Letters Patent No. 605,559, dated June 14, 1898.

Application filed April 12, 1897. Serial No. 631,839. (No model.)

*To all whom it may concern:*

Be it known that I, WALTER TAYLOR, of Norman Park, Brisbane, in the Colony of Queensland, have invented a new and useful Improvement in Detachable Hand Driving-Gear for Cycles; and I do hereby declare that the following is a full, clear, and exact description of the same.

My object is to provide detachable hand driving-gear for cycles in order that the latter may be moved at a greater speed than is now possible.

In order to accomplish my object, I use, in combination with the handle-bar and the ordinary driving-gear, situated between the crank-axle as now used and rear wheel of cycle, an additional gear or gears, as in the case of compound cycles. This hand driving-gear can be fitted on any kind of cycle; but certain parts of the frame of the latter must have divided members to facilitate the working of the endless-chain sprocket-wheels, quadrants, &c.

To illustrate what I mean by "divided" members and to show the position of my gear on cycles, I have selected the frame of a gentleman's bicycle. This additional driving-gear is made detachable, it being possible to remove it in a few minutes. The movable handle-bar can be substituted by an ordinary handle-bar, which at once renders the machine almost in every particular like an ordinary cycle.

In order that my invention may be better understood, I shall now refer to the accompanying sheet of drawings, on which similar letters of reference indicate similar parts in all the views.

Figure 1:
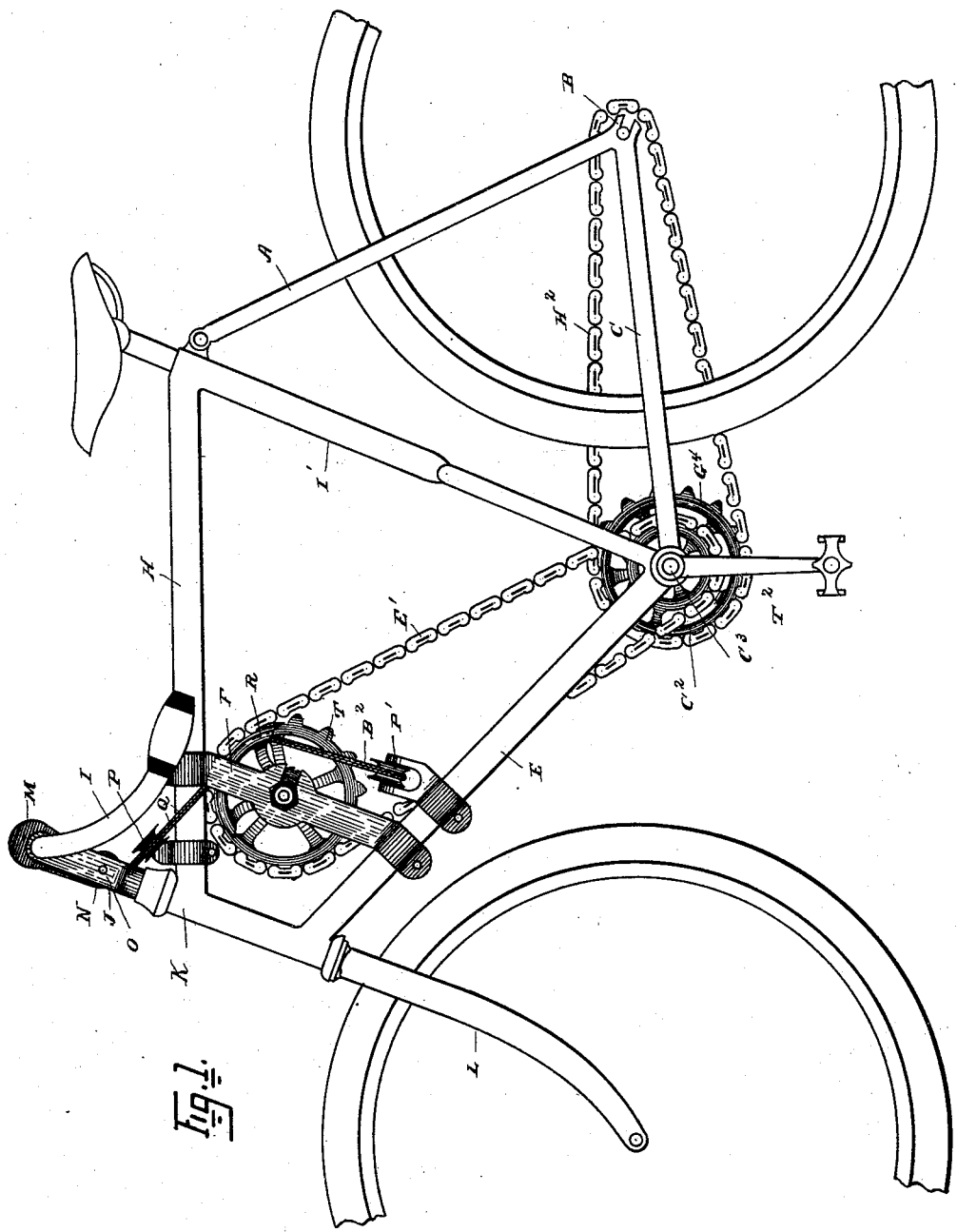
Figure 9:
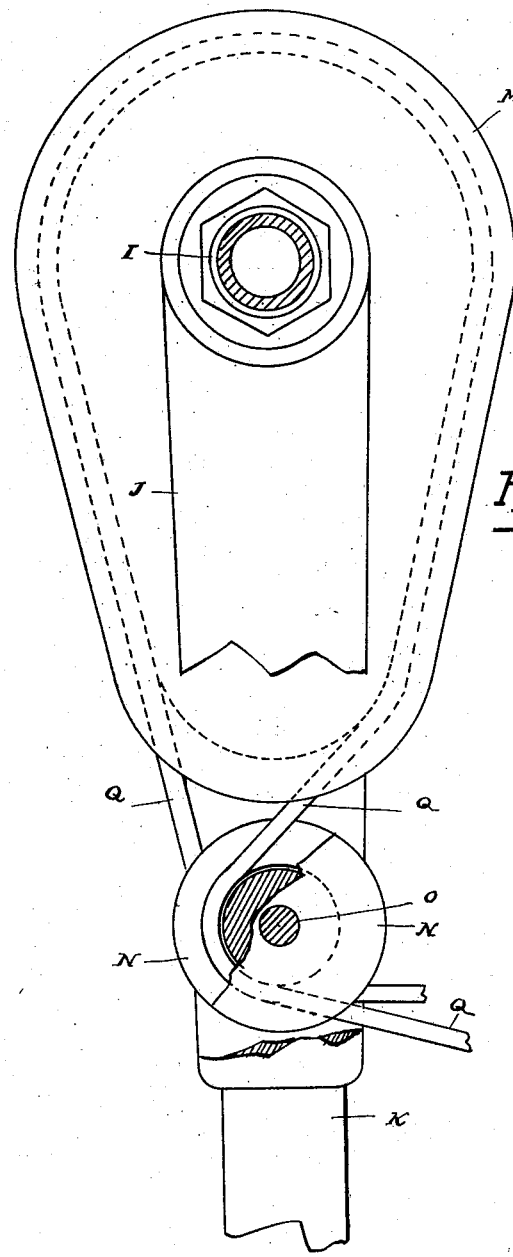
Figure 10:
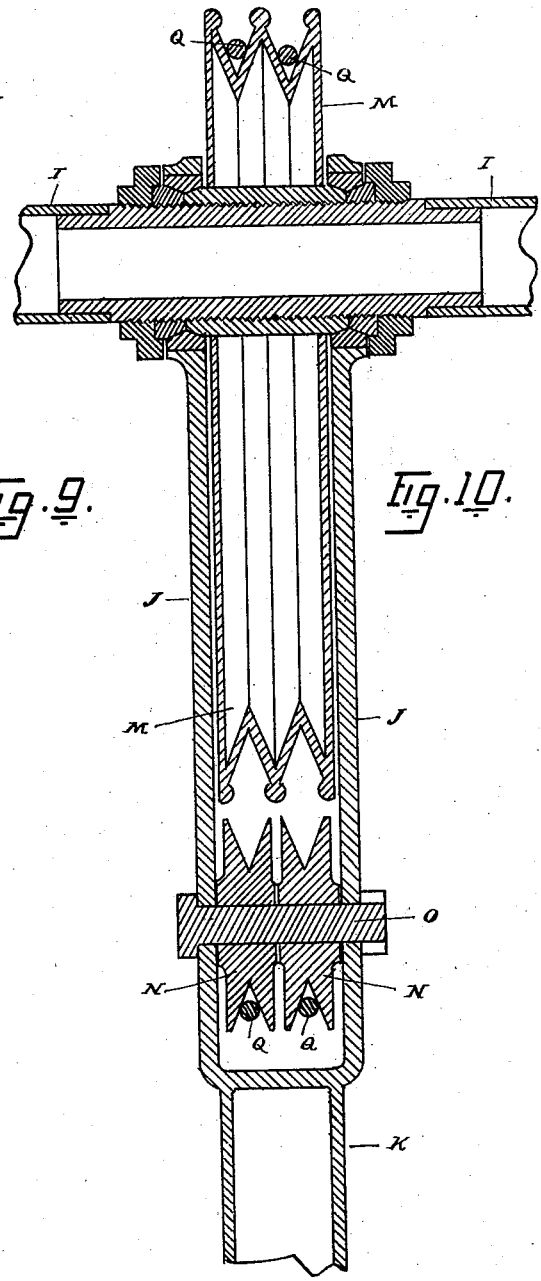

Figure 1 is a side elevation of a cycle with my additional driving-gear. Fig. 2 is a side elevation of the head of cycle-frame, the handle-bar, the upper sprocket-wheel, and quadrants, showing how the cam in the handle-bar and the quadrants in the cycle-frame are connected. Fig. 3 is a perspective view of the cycle-frame shown in Fig. 1. Fig. 4 is a vertical section of the two quadrants and also of what I term the "upper" sprocket-wheel with ratchet-wheels combined, showing axle-bearings of same and detachable parts of cycle-frame. Fig. 5 is a side elevation of one quadrant. Fig. 6 is a side elevation of the upper sprocket-wheel before ratchet-wheels are screwed thereto. Fig. 7 is a side elevation of one ratchet-wheel which is screwed one on either side of the aforesaid upper sprocket-wheel. Fig. 8 is a transverse section of the bottom bracket of cycle-frame, showing crank-axle, crank, and two sprocket-wheels. Fig. 9 is a side elevation of the fork, cam, and wheels of the handle-bar, showing how steel cords work on same. Fig. 10 is a transverse section of the handle-bar, cam, and wheels.

The cycle-frame is comprised of the rear-wheel fork A, having the two axle-bearings B and B, the two bottom divided members C and C, crank-axle bearings D and D, the two divided vertically-inclined supports E and E, the two detachable uprights F and F, with axle-bearings G and G, secured to top bar H, and vertically-inclined supports E and E, with suitable bolts.

I' is the seat-pillar, situated between the upper end of the rear-wheel fork and the bottom of cycle-frame D and D.

L is the front fork, with axle-bearings for front wheel.

K is the head of cycle-frame and shows the position of handle-bar.

I is a movable cycle handle-bar which is screwed to a fork J, secured to the upper end of the front-wheel fork L. Said handle-bar is made to move on suitable cone-bearings and can be operated to the extent of about thirteen inches radius. It carries a cam M, below which are situated two small wheels N and N, carried by a pin O, secured to fork J. Said wheels are free to act upon the said pin O and serve to guide two steel cords Q and Q, while the said cam M draws them upon it or releases them therefrom. Said steel cords are guided one over and onto said cam M and the other under and upon the latter and are secured at their ends to the quadrants R and R' and also to the cam M.

P is a small wheel to prevent steel cords from brushing against the top bar H of cycle-frame.

$B^2$ is a steel cord which passes around the pulley P' and fastens at each end to the quadrants R and R' for the sole purpose of drawing same back again after it has done its work. When quadrant R is drawn up, it must of necessity draw quadrant R' down.

S is the axle of the aforesaid sprocket-wheel J, and U and U' are the two before-mentioned ratchet-wheels, secured by suitable screws to each side of the said sprocket-wheel. The two said quadrants R and R' are one upon each side of said sprocket-wheel T and move freely upon said axle S. Said quadrants are moved upon cone-bearings, while sprocket-wheel T is carried by ball-bearings V and V', situated on suitable cones, which are screwed upon screw-threaded axle S and also form part of the cone-bearings for quadrants R and R'. W and W are cones which form the other part of bearings for said quadrants to move upon. Z and Z' are small nuts for the purpose of adjusting the aforesaid quadrants R and R'.

Y and Y are adjustments for the purpose of adjusting the endless chain E'.

A' and A' are nuts which serve the purpose of securing the axle S to the detachable members F and F.

$A^4$ and $A^4$ are the two pawls, carried by pins $A^3$ and $A^3$, secured by nuts B' and B' to said quadrants.

H is the top bar of cycle-frame.

$G^3$ is the bolt which secures the two members F and F to the aforesaid top bar H.

$C^2$ is the lower sprocket-wheel, secured to screw-threaded crank-axle $C^3$ by lock-nut $F^2$.

D' and D' are balls which run on hardened-steel cups $D^2$ and $D^2$, which are driven tightly into the bottom bracket of cycle-frame.

T' and T' are cones forming bearings for balls D' and D'.

$T^2$ and $T^2$ are cranks.

$G^4$ is sprocket-wheel which forms connection with rear wheel by endless chain $H^2$.

E' is an endless chain communicating motion between said upper sprocket-wheel T and lower sprocket-wheel $C^2$.

$H^2$ is an endless chain which communicates motion between rear wheel and crank-axle $C^3$.

The operation of my additional gear is as follows: We will suppose that the steel cord Q is drawn upon the cam M and that the other steel cord Q is just about to be drawn upon said cam. In this case when the handle-bar I is pressed down by the hands, but within a radius of about thirteen inches, said cam M draws upon it the steel cord Q. While this operation takes place the quadrant R' will be oscillated forwardly and the steel cord $B^2$ will draw the other quadrant back. During this movement the pawls $A^4$ impart about one half a revolution to the ratchet-wheel U', which consequently turns the top sprocket-wheel T. While steel cord Q is being acted upon in this manner by said cam M, the other steel cord is being released, allowing the other quadrant, R, to move backwardly. Said backward movement is brought about by reason of the steel cord $B^2$ passing around the small pulley P' and secured to the other quadrant. The said backward movement of the quadrant also allows the pawls $A^4$ to move in a position that will permit of it imparting the remaining half of the revolution to said ratchet-wheel U, which consequently revolves on said axle S with the upper sprocket-wheel T. It will thus be seen that while said sprocket-wheel T is being turned the endless chain E' communicates motion to the lower sprocket-wheel $C^2$, secured to crank-axle $C^3$, and that as the latter is revolved by foot-power motion is communicated to the endless chain $H^2$, engaging the said sprockets $C^2$ and $G^4$, also the rear sprockets situated upon the axle of the rear wheel of cycle.

In the rotation of the cam M about its center it will be observed that the amount taken up by the cam of the cord connecting the said cam with the one quadrant is greater than that which is being paid out from the cam to the other quadrant, which action is caused by the difference in the radii of the said cam. This discrepancy is provided for in the present invention by the position of the pulley P'. By reason of its position the cords $B^2$, which connect the quadrants, extend upward at an angle to the cords Q, extending from the quadrants to the pulleys N and cam M. By this arrangement the end of the quadrant which is being advanced by the cam M travels at an angle to the extension of the cord $B^2$, or, in other words, takes but a small amount of the cord $B^2$ in proportion to its forward travel. This small amount of the cord $B^2$ which is taken up in the forward movement of the one quadrant is fully compensated for by the amount of the cord Q which is being paid out from the cam M to the other quadrant. By means of this arrangement of the quadrants, the cam M, and the pulley P', with flexible connections or cords Q and $B^2$, I am permitted to use the cam M and gain the advantages derived from its use.

Having thus described this invention, it is claimed—

1. In a bicycle, a driving-gear consisting of a rotatable handle-bar, provided with a cam, a sprocket-wheel mounted on an independent frame between the forward reach-bars of the bicycle-frame and provided with rotatable toothed wheels mounted on either side of the said sprocket-wheel, duplicate quadrants mounted on the opposite sides of the said sprocket-wheel and provided with pawls to engage the said ratchet-wheels on the said sprocket-wheel, flexible attachments between the said quadrants and the cam on the handle-bar, a guide-pulley mounted on the frame of the bicycle to the side of the said quadrant removed from said handle-bar, a flexible connection between the two quadrants to pass under the said guide-pulley, and a flexible connection between the said sprocket-wheel and the crank-shaft of the bicycle, substantially as described.

2. In a bicycle, a driving-gear, consisting in the combination of the handle-bar, I, rotatably mounted in the head of the bicycle-frame, the elongated cam, M, mounted rigidly on the said handle-bar, guide-pulleys, N, N, sprocket-wheel, T, detachable frame, F, forming bearings for the wheel, T, ratchets, U, U', secured to the said sprocket, quadrants R, R', mounted on the shaft with the sprocket, T, and provided with pawls, $A^4$, $A^4$, to engage the said ratchet, flexible connections, Q, Q, attached to the said quadrants and connecting them with the cam, M, after passing under the pulleys, N, N, guide-pulley, P', mounted on the frame of the bicycle, flexible connection, $B^2$, passing under said guide-pulley and connecting the ends of the quadrants, R, R', sprocket-wheel, $C^2$, mounted on the crank-shaft of the bicycle, and sprocket-chain, E', connecting the sprocket-wheels, T and $C^2$, all substantially as described.

In testimony whereof I have signed my name to this specification in the presence of two subscribing witnesses.

WALTER TAYLOR.

Witnesses:
 ARTHUR GRIFFITH,
 WALTER SIGMONT.